US012686410B2

(12) United States Patent
Clifford et al.

(10) Patent No.: US 12,686,410 B2
(45) Date of Patent: Jul. 21, 2026

(54) DETECTION OF LATENT FAILURES IN AUTONOMOUS VEHICLES BASED ON PERFORMANCE AND OPERATIONAL STATUS OF A VEHICLE

(71) Applicant: Cavnue Technology, LLC, Arlington, VA (US)

(72) Inventors: David Hahn Clifford, Royal Oak, MI (US); Demetrios Vasili Kellari, Brooklyn, NY (US)

(73) Assignee: Cavnue Technology, LLC, Arlington, VA (US)

( * ) Notice: Subject to any disclaimer, the term of this patent is extended or adjusted under 35 U.S.C. 154(b) by 461 days.

(21) Appl. No.: 18/189,955

(22) Filed: Mar. 24, 2023

(65) Prior Publication Data

US 2024/0317268 A1 Sep. 26, 2024

(51) Int. Cl.
| | |
|---|---|
| *B60W 60/00* | (2020.01) |
| *B60W 50/02* | (2012.01) |
| *B60W 50/14* | (2020.01) |

(52) U.S. Cl.
CPC .. *B60W 60/00186* (2020.02); *B60W 50/0205* (2013.01); *B60W 50/14* (2013.01); *B60W 2556/45* (2020.02)

(58) Field of Classification Search
CPC ....... B60W 60/00186; B60W 50/0205; B60W 50/14; B60W 2556/45
See application file for complete search history.

(56) References Cited

U.S. PATENT DOCUMENTS

| | | | | |
|---|---|---|---|---|
| 10,633,003 | B1 * | 4/2020 | Abundis Vargas ... | H04W 4/027 |
| 11,919,526 | B1 * | 3/2024 | Agarwal ............. | B60W 50/029 |
| 2020/0334125 | A1 * | 10/2020 | Degaonkar ......... | G06F 11/0709 |
| 2021/0318691 | A1 | 10/2021 | Amini et al. | |
| 2023/0132512 | A1 * | 5/2023 | Clawson ........... | B60W 60/0027 |
| | | | | 701/26 |
| 2023/0152791 | A1 * | 5/2023 | Tang ...................... | G06N 20/00 |
| | | | | 701/23 |

OTHER PUBLICATIONS

Hu et al., "A multirange vehicle speed prediction with application to model predictive control-based integrated power and thermal management of connected hybrid electric vehicles." Journal of Dynamic Systems, Measurement, and Control, 2022, 11 pages.

* cited by examiner

*Primary Examiner* — James J Lee
*Assistant Examiner* — Alexander George Matta
(74) *Attorney, Agent, or Firm* — Fish & Richardson P.C.

(57) ABSTRACT

Systems and techniques are described for how to augment failure detection of a vehicle to detect failures that would otherwise go undetected by the control system of the vehicle, and to mitigate such failures when detected. Performance of the vehicle is observed over time, and based on these observations, the systems and methods determine whether the vehicle is exhibiting a performance characteristic that is indicative of a failure. If so, and if the control system does not identify the failure, then the system generates response data that causes the control system of the vehicle to respond to the performance characteristic that is indicative of the failure.

13 Claims, 3 Drawing Sheets

DETECTION OF LATENT FAILURES IN AUTONOMOUS VEHICLES BASED ON PERFORMANCE AND OPERATIONAL STATUS OF A VEHICLE

BACKGROUND

Autonomous vehicle systems have defined sets of failure modes where the robotic system enters into a deprecated state due to an inability to proceed in an acceptable fashion. The deprecated state may be due to a (i) hardware failure, (ii) a software fault, (iii) an environmental condition, and (iv) an underlying failure of the vehicle platform. Data describing these failure modes, along with data describing a range of actions that are deemed acceptable, e.g., lane change logic, cruise control logic, etc., are stored in a control policy that is utilized by the control system of the vehicle.

However, there may be a situation in which the control system determines the vehicle is performing acceptably and for which a failure is not detected, while, in fact, the vehicle may be exhibiting a performance characteristic that is indicative of a failure. For example, a piece of debris may be stuck in a tire, causing the tire to be slightly out of alignment but not detected by the control system of the vehicle. Thus, over time, the vehicle may veer right until the control system senses the vehicle is nearing the right edge of the lane and corrects to the left. After correction, the vehicle may again veer right, and the control system again needs to correct and steer left. By way of another example, assume a vehicle has both optical and radar sensors, each with different detection ranges, and with the optical sensor having the farthest range. There may be a particular color that the vehicle control network may not recognize or not distinguish from a concrete highway under certain lighting conditions. Thus, when a vehicle of such color is in front of a vehicle using adaptive cruise control, the adaptive cruise control may speed up until the radar senses the automobile of that particular color in front of the vehicle, and the control system then reduces speed. However, once the automobile in front of the vehicle is out of radar range, the vehicle may then speed up again, as the optical sensor is blind to the particular color of the automobile in front of the vehicle. Similar situations can occur when new styles of cars or motorcycles are released, and the AI network on the vehicle has not been trained to recognize the new profiles as vehicles. These are but a few examples of failures that may occur but that are not detected by the control system of the vehicle.

SUMMARY

The subject matter of this application describes how to augment failure detection of a vehicle in detecting failures that would otherwise go undetected by the control system of the vehicle, and to mitigate such failures when detected.

In general, one innovative aspect of the subject matter described in this specification can be embodied in methods that include the actions of: receiving, by a data processing apparatus and for a vehicle, status data describing performance and operational status of the vehicle while in operation; accessing, by the data processing apparatus, a control policy for the vehicle that describes a range of actions for the vehicle that are acceptable for autonomous control and failure modes; determining, by the data processing apparatus, based on the performance described by the status data, whether the vehicle is exhibiting a performance characteristic that is indicative of a failure; in response to determining that the vehicle is exhibiting a performance characteristic that is indicative of a failure, determining, by the data processing apparatus, based on the operational status described by the status data, whether a control system of the vehicle has detected a failure in response to the exhibited performance characteristic; in response to determining that the control system of the vehicle has not detected a failure in response to the exhibited performance characteristic, generating, by the data processing apparatus, for the control system of the vehicle, response data that causes the control system of the vehicle to respond to the performance characteristic that is indicative of the failure; and providing, by the data processing apparatus, the response data to the control system of the vehicle.

In an optional feature, the response data comprises alert data that includes data indicating the performance characteristic is indicative of a failure; and the alert data causes the control system of the vehicle to generate an alert that notifies a driver of the vehicle that the performance characteristic is indicative of a failure.

In an optional feature, the response data further comprises remediation data that causes the control system to adjust performance of the vehicle to mitigate the performance characteristic that is indicative of a failure.

In an optional feature, the response data comprises remediation data that causes the control system to adjust performance of the vehicle to mitigate the performance characteristic that is indicative of a failure.

In an optional feature, the remediation data causes the control system to adjust performance of the vehicle to mitigate the performance characteristic by causing the vehicle to traverse to a safe harbor region and park at the safe harbor region.

In an optional feature, the remediation data causes the control system to adjust performance of the vehicle to mitigate the performance characteristic by causing the vehicle to compensate in a manner that reduces the performance characteristic while continuing travel.

In an optional feature, the data processing apparatus is a system that is separate from the vehicle and communicates with the vehicle by a wireless communication link.

In an optional feature, the data processing apparatus receives status data for a plurality of vehicles and generates respective response data for each of the plurality of vehicles, and the operations further comprise: determining, for each vehicle of the plurality of vehicles, a make and model of the vehicle; providing, to respective manufactures of each of the plurality of vehicles for which respective response data is provided: the status data describing performance and operational status of the vehicle while in operation, the determined performance characteristic exhibited for the vehicle that is indicative of a failure, and the response data generated for the vehicle.

Other embodiments of this aspect include corresponding systems, apparatus, and computer programs, configured to perform the actions of the methods, encoded on computer storage devices.

The systems and methods described above may realize one or more of the following advantages. Latent failures/anomalies that would remain undetected can be identified by vehicle performance data over time. This allows for the detection of errors that are either not detected by use of a vehicle control policy or otherwise not accounted for by a vehicle control policy. The notification to the driver increases driver and passenger safety, and also assists the driver in ensuring that corrective and/or preventative maintenance is performed.

When data is observed for multiple vehicles, the detection of latent failures for multiple vehicles can be interpreted as an indication that a particular control policy requires updating, and/or that a particular vehicle make or model may require service and/or recall work. Again, this increases driver and passenger safety. Moreover, this also facilitates real-time failure detection in multiple vehicles that would otherwise go unnoticed.

The response data generated for the vehicle can cause the vehicle to notify the driver of the latent anomaly, and/or adjust performance of the vehicle to mitigate the performance characteristic that is indicative of the failure. Again, such actions increase driver safety and provide for real-time mitigation in the field.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The subject matter of this application describes how to augment failure detection of a vehicle to detect failures that would otherwise go undetected by the control system of the vehicle, and, optionally, to mitigate such failures when detected. Performance of the vehicle is observed over time, and based on these observations, the systems and methods determine whether the vehicle is exhibiting a performance characteristic that is indicative of a failure. If so, and if the control system does not identify the failure, then the system generates response data that causes the control system of the vehicle to respond to the performance characteristic that is indicative of the failure.

The response can be a notification to the driver, and/or adjusting performance of the vehicle to mitigate the performance characteristic that is indicative of a failure. The performance adjustment can range from compensation to even shutting down the vehicle, depending on severity of the failure.

As used herein, a "failure" encompasses performance that deviates from an acceptable range in a control policy, or otherwise is anomalous. Thus, a failure may be determined for a performance characteristic that ranges from anomalous behavior, e.g., phantom breaking or steering to correct a minor alignment problem as describe above, to behavior that is of such an impact to safety that the vehicle is to be brought to the roadside and shut down. At latent failure, also referred to as an undetected failure, is a failure that is observed by the failure detection system (described below) from the performance of a vehicle specified by the status data received from the vehicle, and that is not detected by the vehicle itself, e.g., by a failure/safety monitoring system of the vehicle utilizing a particular control policy.

These features and additional features are described in more detail below.

Figure 1:
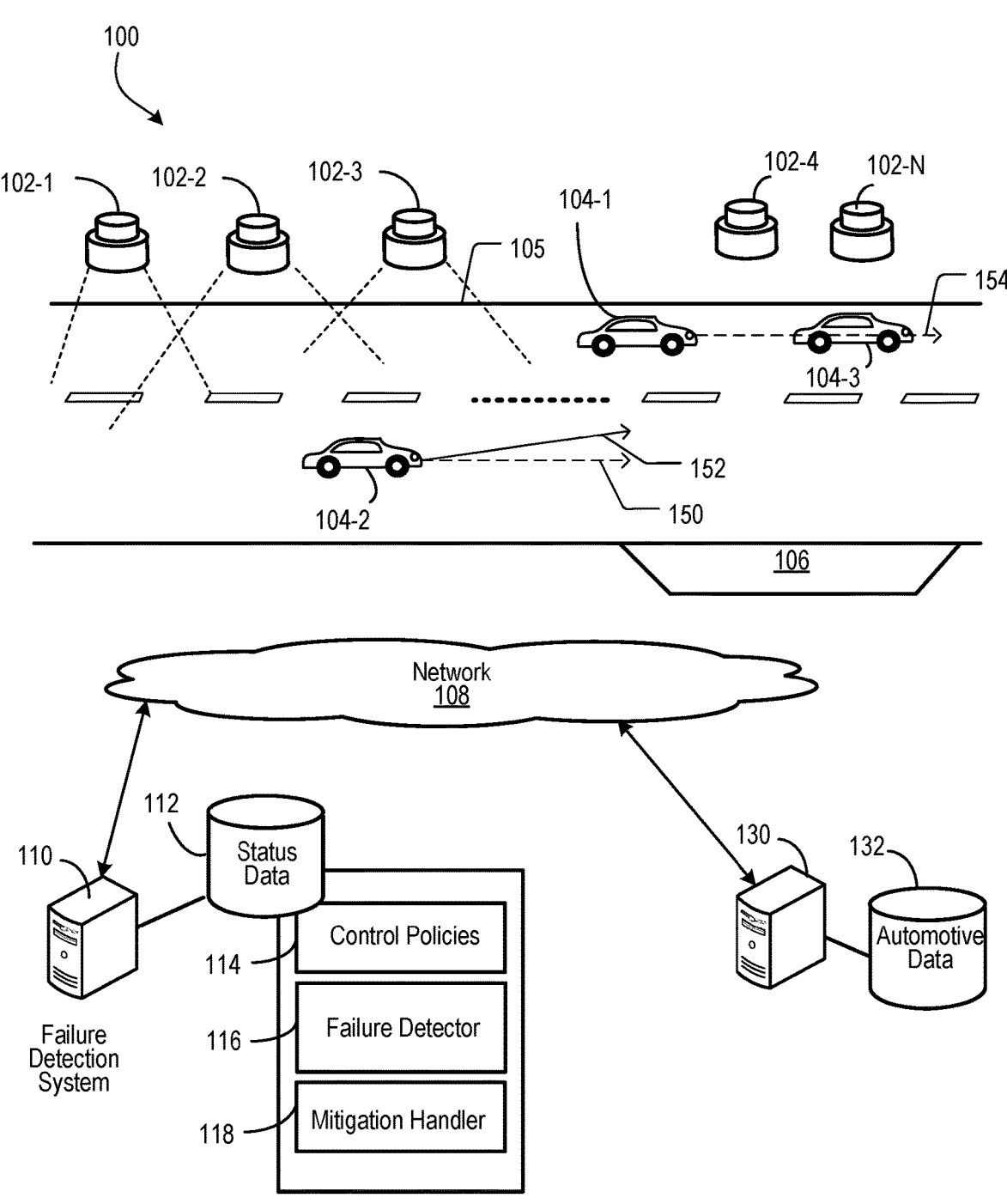
FIG. 1 is a block diagram of an example environment in which a failure detection for a vehicle when the control system of the vehicle has not detected the failure can be implemented.

FIG. 1 is a block diagram of an example environment 100 in which a failure detection for a vehicle when the control system of the vehicle has not detected the failure can be implemented. As will be described below, a failure detection system 110 is implemented as a stand-alone system that receives status data from vehicles through one or more wireless links, e.g., wireless communication channels. Alternatively, the main detection functions of the failure detection system can be implemented in each of the vehicles themselves to augment failure and safety systems on vehicles that are subject to a control policy.

In yet another alternative, the failure detection system 110 may be implemented as part of an intelligent traffic system that is deployed upon a road 105 on which vehicles 104-1, 104-2 and 104-3 (collectively "vehicles 104") travel. The intelligent traffic system includes a plurality of sensors 102-1 through 102-N (collectively "sensors 102") that report to the failure detection system 110 (or, alternatively, a central server system that implements the failure detection system 110 as one of several subsystems in an intelligent traffic system). The road 105 includes multiple lanes in a particular direction and, in some areas, a safe harbor region 106 in which vehicles may be instructed to enter due to being partially disabled or any other reason the intelligent traffic system determines a vehicle should go off the road 105.

The sensors 102 situated along the road 105, e.g., sensors 102-1 through 102-N, generate sensor data regarding particular events on the road 105, e.g., vehicle moving on the road in a particular direction or a vehicular car accident. The system 110 can monitor the sensor data that not only describes the vehicle or the event but can also describe a location of the object within a lane of the road 105, a speed of that vehicle, and the relationship of that vehicle relative to other vehicles. Moreover, the system can generate and monitor sensor data in a similar manner for multiple events as well. As used herein, an "event" in the context of the roadway includes traffic conditions (slow traffic, jams, etc.), obstacles on the road (stalled vehicles, debris, water, ice, etc.), emergency vehicles (ambulances, firetrucks, police cruises operating in a manner that requires traffic to yield), or any other condition or obstacle that the sensors and system can detect and identify and that may require a change a driving behavior of the vehicle or change in traffic flow.

The sensors 102 can include a variety of software and hardware devices that monitor objects on road 105. For example, the sensors 102 can include a LIDAR system, a video camera, a radar system, a Bluetooth system, and a Wi-Fi system, to name a few examples. A sensor can include a combination of varying sensor types. For example, sensor 102-1 can include a video camera, a radar system, and a motion detection system; sensor 102-2 can include a video camera and a radar system; and sensor 102-N can include a video camera, a LIDAR system, and a Wi-Fi system. Alternatively, a sensor may just include a single component, such as a LIDAR system. Additionally, other sensor combinations are possible.

The vehicles 104 may be autonomous vehicles, semi-autonomous vehicles, or vehicles always under human control but that include driving assist capabilities, such as auto breaking, adaptive cruise control, lane assist driving, etc. Whether fully autonomous or only providing certain driving assist capabilities, all of the vehicles include a control policy for the vehicle that describes a range of actions for the vehicle that are acceptable for autonomous control, and failure modes. As used herein, "autonomous control" means a control that is automatically implemented by the vehicle, whether under human control or fully autonomous control. For example, complete autonomous driving, without any human intervention, is an example of autonomous control. However, automatic breaking, adjusting cruise control speed to maintain a minimum distance from a leading vehicle, and automatic lane correction while a vehicle is otherwise under human control are also examples of autonomous control.

The vehicles 104 include on-board sensors and processing systems that can sense vehicles, obstacles, road markings, and collect other information to process and implement autonomous actions. The on-board sensors may be one or more of visual sensors, acoustic sensors, and electromagnetic sensors, and have similar detection capabilities as described above. In response, the vehicle's on-board processing system can adjust a driving behavior of the vehicle based on the interpreted context or meaning of the sensed data.

The failure detection system 110 communicates with the vehicles 104 over a network 108. The network 108 may be one or more wired and wireless networks, connected to each other by gateways or other communication devices and switches. As will be described with reference to FIG. 2, the failure detection system receives status data 112 from each of the vehicles 104. For each vehicle, the system 110 determines from the status data, using a failure detector 116, whether the vehicle 104 is exhibiting anomalous behavior based on a control policy for the vehicle. If anomalous behavior is detected, the system 110 determines whether the control system of the vehicle has detected a failure. If the control system has not detected the failure, then the system 110 generates, using a mitigation handler 118, response data that causes the control system of the vehicle to respond to the anomalous behavior, and provides the response data to the control system of the vehicle.

Figure 2:
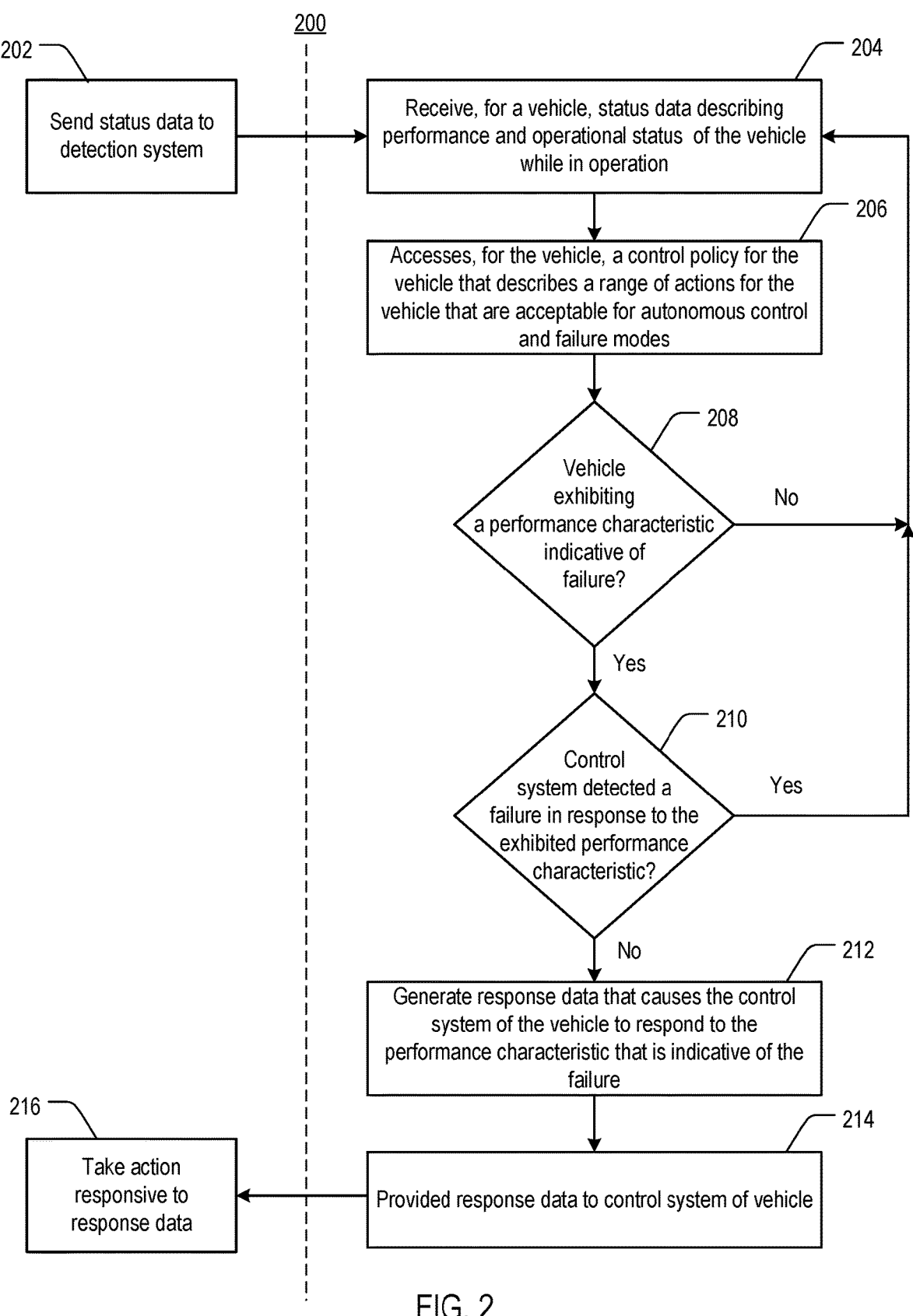
FIG. 2 is a flow diagram of an example process for failure detection for a vehicle in which the control system of the vehicle has not detected the failure.

These features are described in more detail with reference to FIG. 2, which is a flow diagram of an example process 200 for failure detection for a vehicle in which the control system of the vehicle has not detected the failure. The system 110 implements the failure detector 116 and the mitigation handler 118 using one or more processors that are programmed to perform the operations described. Moreover, while the failure detector 116 and the mitigation handler 118 are described as separate software implements, they can be combined into a single software implement.

In operation, the vehicles send status data to the detection system 110 (202). The status data is stored in a status data store 112 and describes performance and operational status of the vehicle while in operation. Example status data may include all system failures/errors/anomalies detected; actions taken by the vehicle over a time period; speed; direction; environmental control conditions and settings, and any other information describing operational aspects of the vehicle. The status data may also include the make and model of the vehicle, and an identifier that identifies the control policy of the vehicle.

The status data may be reported for a period of time, e.g., every n seconds, where n may range from a few seconds to hundreds of second or more. In implementations in which the detection system 110 is on board a vehicle 104, the status data may be reported continuously to the system 110, as in such a deployment the bandwidth and network access is not constrained as it is when the system 110 is implemented remotely and data are exchanged over the network 108.

The system 110 receives the status data (204). When the system is implemented separate from vehicles, it may receive the status data from multiple vehicles and store the data in the status data store 112.

The system 110 accesses the control policy for the vehicle that describes a range of actions for the vehicle that are acceptable for autonomous control and failure modes (206). The control policy may be one of multiple control policies stored by the system 110, and the particular control policy accessed may be based on the identifier that identifies the control policy utilized by the control system of the vehicle.

The system 110 determines, based on the performance described by the status data, whether the vehicle is exhibiting a performance characteristic that is indicative of a failure (208). Such failures can include veering left over time, phantom breaking, etc. For example, a vehicle may be slightly out of alignment, but the misalignment may not be detected by the on-board control system. Thus, while the vehicle data may indicate the vehicle is traveling in a straight line, e.g., as indicated by the phantom line 150 for vehicle 104-2, the vehicle may actually be veering slightly left, as indicated by the solid line 152 (which exaggerates, for illustration, how the vehicle is veering left). As a result, over time, the lane assist may issue a command to steer right and then resume a straight path. Once the correction is made, however, the vehicle may again begin veering left. Thus, over time, the status data will indicate a periodic right turn adjustment for the automobile even though the detected roadway data and the reported steering data indicate the car is traveling on a straight path. This pattern is a performance characteristic that is indicative of failure.

Phantom breaking may occur when one or more automobile sensors may not detect another leading vehicle. For example, assume an adaptive cruise control system utilizes both visual and radar sensors, with the visual sensor having a longer range, and the adaptive cruise control is set to pace a leading car by the maximum range of the visual sensor. This maximum range is indicated by the arrow 154 in FIG. 1, with the arrowhead being at the maximum range. The visual sensor may be operating correctly, but the object detection AI on the vehicle may not have been trained to recognize a new type of vehicle, e.g., a vehicle with a new and unique body shape. Instead, the AI may incorrectly identify the new and unique body shape as two very distant vehicles. Accordingly, the vehicle 104-1 control system will not detect the actual presence of the vehicle 104-3 at the maximum range, and thus the vehicle 104-1 will accelerate to a desired cruise control speed. As a result, the vehicle 104-1 closes on the vehicle 104-3.

At some closer distance the radar sensor of the vehicle 104-1 will detect the vehicle 104-3, or, alternatively or in addition, the AI will eventually detect the presence of the vehicle 104-3. The control system of the vehicle 104-1 will thus cause the vehicle 104-1 to slow down, perhaps abruptly, as the vehicle 104-3 is not detected until it is well within the desired maximum range 154. However, once the vehicle 104-3 gains enough of a lead over 104-1, the vehicle 104-1 will begin to gain speed. The breaking process will then repeat, because the control system on the vehicle 104-1 cannot generate the correct set of sensor data to maintain the desired trailing distance from the vehicle 104-3. Thus, over time, the status data will establish the phantom breaking pattern, which is another performance characteristic that is indicative of failure.

The above are but two examples of failures that may go undetected by control systems of vehicles. Other types of failure may involve environmental detection failures, e.g., an intermittent detection of a wet windshield when the windshield is, in fact, dry; environmental control failures; and the like.

To determine if a vehicle is exhibiting a performance characteristic that is indicative of a failure, the failure detector 116 can perform several different data analysis operations. For example, pattern detection can be performed on control adjustments, and periodic detections, e.g., as described above, will be flagged as performance characteristics that are indicative of a failure. Likewise, data consistency analysis for data from multiple on-board sensors can be performed to detect performance characteristics that are indicative of a failure. For example, a particular light sensor may control headlight activation, and the light sensor may be partially covered or otherwise occluded. This may result is infrequent activation of automatic headlights while other sensor data, e.g., camera data that includes luminosity values, indicate a daylight situation and that the vehicle is not in a dark location, such as a tunnel.

If the system 110 determines the vehicle is not exhibiting a performance characteristic that is indicative of a failure, then the process 200 returns to 204. However, if the system 110 determines the vehicle is exhibiting a performance characteristic that is indicative of a failure, then the system 110 determines, based on the operational status described by the status data, whether a control system of the vehicle has detected a failure in response to the exhibited performance characteristic (210). For example, the system 110 determines whether the status data has data indicating a failure that corresponds to the detected performance characteristic. To illustrate, for the repeated steering to correct the list caused by the misalignment, the system 110 may determine that the control system of the vehicle has not recorded an anomalous condition based on the control policy, as the control policy may define a steering failure by parameter values that result in a false negative detection for the slight listing of the vehicle. Likewise, for the phantom breaking, the system 110 determine that the control system of the vehicle has not recorded an anomalous condition based on the control policy, as the control policy may define phantom breaking based on speed and frequency parameters that result in a false negative detection for the phantom breaking indicated in the actual status data.

If the system 110 determines the control system of the vehicle has detected a failure in response to the exhibited performance characteristic, then the process 200 returns to 204. This is indicative a control policy that accounts for the observed failure in the status data.

Conversely, if the system 110 determines the control system of the vehicle has not detected a failure in response to the exhibited performance characteristic, then system 110 generates response data that causes the control system of the vehicle to respond to the performance characteristic that is indicative of the failure (212), and then provides the response data to the vehicle (214). The vehicle then takes action, by the control system, responsive to the response data (216).

The response data are instructions that are executable by the control system of the vehicle, or data that can be processed by the control system to perform the action. In some implementations, the response data includes alert data that indicates the performance characteristic is indicative of a failure. The alert data causes the control system of the vehicle to generate an alert that notifies a driver of the vehicle that the performance characteristic is indicative of a failure. For example, the alert data may cause the vehicle to display a message on a console, or speak a message, or both. In the case of the steering correction, the message may be "This car is slightly veering left. You may have an alignment issue or low tire pressures. You should bring your vehicle in for service."

The response data can also include remediation data that causes the control system to adjust performance of the vehicle to mitigate the performance characteristic that is indicative of a failure. For example, in the case of the vehicle veering left, the remediation data may cause the vehicle to steer right by a calculated angle, e.g., 0.15 degrees, to compensate for the slight list. The alert data may also inform the driver that the vehicle's performance has been adjusted, and the manner in which it is adjusted. Upon service, the compensation factor will be removed.

The type of mitigation may depend on the detected failure. For example, in the case of phantom breaking with adaptive cruise control, the cruise control may be disabled, or the adaptive feature may be disabled. The alert may be a message explaining the detected error, the possible causes, and the temporarily depreciated features.

If the detected failure is of a magnitude that further driving presents an unacceptable safety risk, and the vehicle is an autonomous vehicle, the remediation data causes the control system to instruct the vehicle to traverse to a safe harbor region and park at the safe harbor region. For less severe failures, such as the phantom breaking or listing as described above, the remediation data only causes the vehicle to compensate in a manner that compensates for the performance characteristic while continuing travel.

Figures 3, 4:
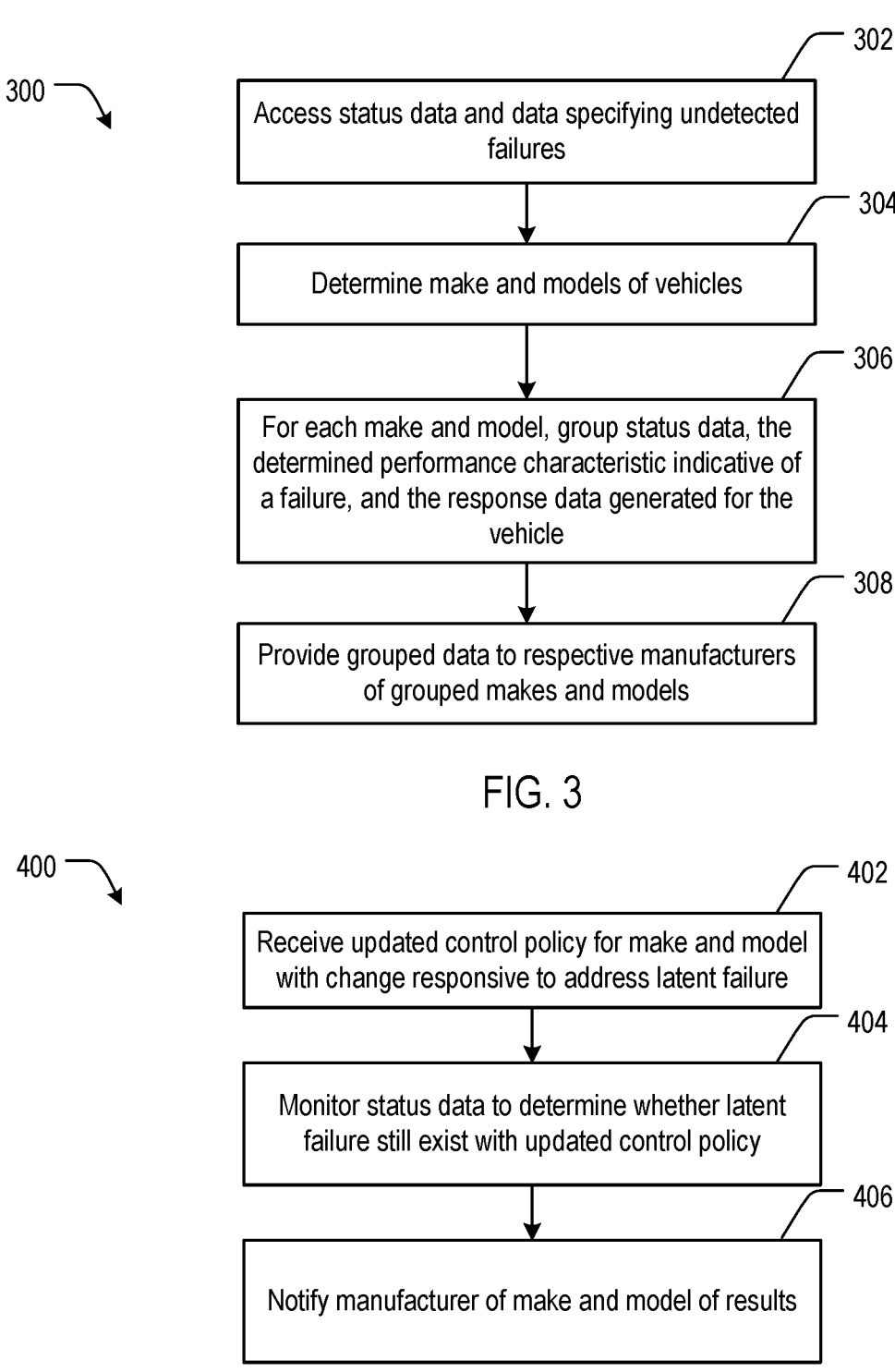
FIG. 3 is a flow diagram of an example process for providing failure detection data to respective manufacturers.
FIG. 4 is a flow diagram of an example process for analyzing and reporting results of an updated control policy.

FIG. 3 is a flow diagram of an example process 300 for providing failure detection data to respective manufacturers. Such failure detection data can be useful for manufacturers to revise and/or update control policies, sensor systems, and the like to address failures that are detected by the failure system 110 but that go undetected by the on-board systems of a vehicle. For example, in FIG. 1, the data may be provided to a computer system 130 of a manufacture, which then incorporates the data into its own automotive data 132 that is used for development, testing and troubleshooting.

The failure system 110 accesses the status data specifying the undetected failures (302). The system 110 then keys off the data specifying the undetected failures to determine, for each vehicle for which an undetected failure was detected, a make and model of the vehicle (304).

The system 110 then, for each make and model, groups status data, the determined performance characteristic indicative of a failure, and (optionally) the response data generated for the vehicle (306). Accordingly, the failure data is collected for vehicles by their respective makes and models.

Finally, the system 110 provides the grouped data to respective manufacturers of the grouped makes and models (308). For example, the system 110 provides, to respective manufactures of each of the vehicles for which respective response data was provided: the status data describing performance and operational status of the vehicle while in operation, the determined performance characteristic exhibited for the vehicle that is indicative of a failure; the control policy used; and (optionally) the response data generated for the vehicle.

FIG. 4 is a flow diagram of an example process 400 for analyzing and reporting results of an updated control policy. The system 110 can analyze the efficacy of a control policy that has been revised in response to the failure data provided according to the process 300 of FIG. 3.

In operation, the system 110 receives an updated control policy for a particular make and model with changes responsive to address the latent failure (402). The system 110 then monitors status data to determine whether latent failure still exists with updated control policy.

Because the control policy is identified as being updated in response to specific failure data, the system 110 can monitor the vehicles that operate subject to the control policy to determine whether the failures, if they occur, are still undetected by the vehicle systems. If the failures are still undetected, then the update to the control policy did not achieve the intended purpose. Conversely, if the failures are detected, then the update to the control policy did achieve the intended purpose. The results are then provided to the manufacture (406).

In some implementations, additional data provided by other systems can be processed by the system 110 for failure detection. For example, in FIG. 1, the intelligence traffic system may provide data from sensors 102 that the system 110 can also process to assist in determining undetected errors. For example, assuming individual vehicles are identified and tracked, the data provided by the intelligent traffic system can be of assistance in diagnosing detections failures, such as in the case of phantom breaking, as the relative positions of vehicles can be determined. Likewise, weather data, such as cross wind speed, can also be factored in when determining if steering errors are occurring. For example, the presences of a strong crosswind may indicate that the wind, and not alignment or tire pressure, is the cause of the periodic steering corrections.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
receiving, by a data processing apparatus and for a vehicle, status data describing performance and operational status of the vehicle while in operation, wherein the data processing apparatus is a system that is separate from the vehicle and communicates with the vehicle by a wireless communication link;

accessing, by the data processing apparatus, a control policy for the vehicle that describes a range of actions for the vehicle that are acceptable for autonomous control and failure modes;
determining, by the data processing apparatus, based on the performance described by the status data, whether the vehicle is exhibiting a performance characteristic that is indicative of a failure;
in response to determining that the vehicle is exhibiting a performance characteristic that is indicative of a failure, determining, by the data processing apparatus, based on the operational status described by the status data, whether a control system of the vehicle has detected a failure in response to the exhibited performance characteristic;
in response to determining that the control system of the vehicle has not detected a failure in response to the exhibited performance characteristic, generating, by the data processing apparatus, for the control system of the vehicle, response data that causes the control system of the vehicle to respond to the performance characteristic that is indicative of the failure; and
providing, by the data processing apparatus, the response data to the control system of the vehicle;
wherein the data processing apparatus receives status data for a plurality of vehicles and generates respective response data for each of the plurality of vehicles, and further comprising:
determining, for each vehicle of the plurality of vehicles, a make and model of the vehicle;
providing, to respective manufactures of each of the plurality of vehicles for which respective response data is provided:
the status data describing performance and operational status of the vehicle while in operation;
the determined performance characteristic exhibited for the vehicle that is indicative of a failure; and
the response data generated for the vehicle.
2. The computer-implemented method of claim 1, wherein:
the response data comprises alert data that includes data indicating the performance characteristic is indicative of a failure; and
the alert data causes the control system of the vehicle to generate an alert that notifies a driver of the vehicle that the performance characteristic is indicative of a failure.
3. The computer-implemented method of claim 2, wherein:
the response data further comprises remediation data that causes the control system to adjust performance of the vehicle to mitigate the performance characteristic that is indicative of a failure.
4. The computer-implemented method of claim 1, wherein:
the response data comprises remediation data that causes the control system to adjust performance of the vehicle to mitigate the performance characteristic that is indicative of a failure.
5. The computer-implemented method of claim 4, wherein the remediation data causes the control system to adjust performance of the vehicle to mitigate the performance characteristic by causing the vehicle to traverse to a safe harbor region and park at the safe harbor region.
6. The computer-implemented method of claim 4, wherein the remediation data causes the control system to adjust performance of the vehicle to mitigate the performance characteristic by causing the vehicle to compensate in a manner that reduces the performance characteristic while continuing travel.

7. A system, comprising:

a data processing apparatus comprising one or more computers;

a non-transitory computer readable medium storing instructions executable by a data processing apparatus and that upon such execution cause the data processing apparatus to perform operations comprising:

receiving, by a data processing apparatus and for a vehicle, status data describing performance and operational status of the vehicle while in operation, wherein the data processing apparatus is a system that is separate from the vehicle and communicates with the vehicle by a wireless communication link;

accessing, by the data processing apparatus, a control policy for the vehicle that describes a range of actions for the vehicle that are acceptable for autonomous control and failure modes;

determining, by the data processing apparatus, based on the performance described by the status data, whether the vehicle is exhibiting a performance characteristic that is indicative of a failure;

in response to determining that the vehicle is exhibiting a performance characteristic that is indicative of a failure, determining, by the data processing apparatus, based on the operational status described by the status data, whether a control system of the vehicle has detected a failure in response to the exhibited performance characteristic;

in response to determining that the control system of the vehicle has not detected a failure in response to the exhibited performance characteristic, generating, by the data processing apparatus, for the control system of the vehicle, response data that causes the control system of the vehicle to respond to the performance characteristic that is indicative of the failure; and providing, by the data processing apparatus, the response data to the control system of the vehicle;

wherein the data processing apparatus receives status data for a plurality of vehicles and generates respective response data for each of the plurality of vehicles, and further comprising:

determining, for each vehicle of the plurality of vehicles, a make and model of the vehicle;

providing, to respective manufactures of each of the plurality of vehicles for which respective response data is provided:

the status data describing performance and operational status of the vehicle while in operation;

the determined performance characteristic exhibited for the vehicle that is indicative of a failure; and the response data generated for the vehicle.

8. The system of claim 7, wherein:

the response data comprises alert data that includes data indicating the performance characteristic is indicative of a failure; and the alert data causes the control system of the vehicle to generate an alert that notifies a driver of the vehicle that the performance characteristic is indicative of a failure.

9. The system of claim 8, wherein:

the response data further comprises remediation data that causes the control system to adjust performance of the vehicle to mitigate the performance characteristic that is indicative of a failure.

10. The system of claim 7, wherein:

the response data comprises remediation data that causes the control system to adjust performance of the vehicle to mitigate the performance characteristic that is indicative of a failure.

11. The system of claim 10, wherein the remediation data causes the control system to adjust performance of the vehicle to mitigate the performance characteristic by causing the vehicle to traverse to a safe harbor region and park at the safe harbor region.

12. The system of claim 10, wherein the remediation data causes the control system to adjust performance of the vehicle to mitigate the performance characteristic by causing the vehicle to compensate in a manner that reduces the performance characteristic while continuing travel.

13. A non-transitory computer readable medium storing instructions executable by a data processing apparatus and that upon such execution cause the data processing apparatus to perform operations comprising:

receiving, for a vehicle, status data describing performance and operational status of the vehicle while in operation, wherein the data processing apparatus is a system that is separate from the vehicle and communicates with the vehicle by a wireless communication link;

accessing a control policy for the vehicle that describes a range of actions for the vehicle that are acceptable for autonomous control and failure modes;

determining based on the performance described by the status data, whether the vehicle is exhibiting a performance characteristic that is indicative of a failure;

in response to determining that the vehicle is exhibiting a performance characteristic that is indicative of a failure, determining based on the operational status described by the status data, whether a control system of the vehicle has detected a failure in response to the exhibited performance characteristic;

in response to determining that the control system of the vehicle has not detected a failure in response to the exhibited performance characteristic, generating, for the control system of the vehicle, response data that causes the control system of the vehicle to respond to the performance characteristic that is indicative of the failure; and providing the response data to the control system of the vehicle;

wherein the data processing apparatus receives status data for a plurality of vehicles and generates respective response data for each of the plurality of vehicles, and further comprising:

determining, for each vehicle of the plurality of vehicles, a make and model of the vehicle;

providing, to respective manufactures of each of the plurality of vehicles for which respective response data is provided:

the status data describing performance and operational status of the vehicle while in operation;

the determined performance characteristic exhibited for the vehicle that is indicative of a failure; and the response data generated for the vehicle.

* * * * *